(12) United States Patent
Chuang et al.

(10) Patent No.: US 8,307,510 B2
(45) Date of Patent: Nov. 13, 2012

(54) ELECTRONIC DEVICE AND MOVING MECHANISM THEREOF

(75) Inventors: I-Cheng Chuang, Taoyuan County (TW); Ying-Xing Lee, Taoyuan County (TW); Chien-Wei Huang, Taoyuan County (TW); Ying-Yen Cheng, Taoyuan County (TW); Ying-Hao Yeh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 443 days.

(21) Appl. No.: 12/688,527

(22) Filed: Jan. 15, 2010

(65) Prior Publication Data

US 2010/0323770 A1    Dec. 23, 2010

(30) Foreign Application Priority Data

Jun. 18, 2009    (TW) ................................ 98120381 A (51) Int. Cl.
*E05D 15/06* (2006.01)
(52) U.S. Cl. ...... 16/364; 16/362; 455/575.3; 455/575.4; 379/433.12; 379/433.13
(58) Field of Classification Search .................... 16/245, 16/258, 326, 327, 345, 352, 362, 363, 364, 16/86.2, 350; 455/575.3, 575.4; 379/433.11, 379/433.12, 433.13; 361/679.11, 679.12
See application file for complete search history.

(56) References Cited

U.S. PATENT DOCUMENTS

| | | | |
|---|---|---|---|
| 7,650,671 B2* | 1/2010 | Lee ................................. | 16/362 |
| 7,716,786 B2* | 5/2010 | Shen .............................. | 16/258 |
| 7,725,988 B2* | 6/2010 | Kim et al. ...................... | 16/362 |
| 8,018,714 B2* | 9/2011 | Luke et al. .................. | 455/575.3 |
| 8,077,854 B2* | 12/2011 | Ou et al. ..................... | 455/575.3 |
| 8,081,449 B2* | 12/2011 | Lin et al. .................... | 455/575.4 |
| 2007/0105606 A1* | 5/2007 | Yoon et al. ................. | 455/575.4 |
| 2007/0252202 A1 | 11/2007 | Park et al. | |
| 2008/0081505 A1 | 4/2008 | Ou et al. | |
| 2008/0161075 A1* | 7/2008 | Kim et al. ................... | 455/575.4 |
| 2008/0174942 A1 | 7/2008 | Yang et al. | |
| 2008/0304217 A1 | 12/2008 | Lai et al. | |
| 2009/0007383 A1* | 1/2009 | Lee .............................. | 16/362 |
| 2009/0233659 A1* | 9/2009 | Ke et al. ..................... | 455/575.3 |
| 2009/0286573 A1* | 11/2009 | Jang et al. .................. | 455/575.4 |
| 2010/0149733 A1* | 6/2010 | Luke et al. ............... | 361/679.01 |
| 2010/0218343 A1* | 9/2010 | Cheng et al. .................... | 16/297 |
| 2010/0285852 A1* | 11/2010 | Stephenson ............... | 455/575.4 |
| 2010/0304802 A1* | 12/2010 | Chuang et al. ............. | 455/575.4 |
| 2010/0321866 A1* | 12/2010 | Chuang et al. ........... | 361/679.01 |

FOREIGN PATENT DOCUMENTS

WO    WO 2009/038375 A2    3/2009

* cited by examiner

*Primary Examiner* — Jeffrey O Brien
(74) *Attorney, Agent, or Firm* — Birch, Stewart, Kolasch & Birch, LLP (57) ABSTRACT

A moving mechanism of an electronic device is provided, including a first member, a second member, a sliding member slidably connected to the first member, and a pivot rotatably connecting the second member with the sliding member. When the first member slides relative to the sliding member, a latch member on the first member is pressed by the sliding member to a retracted position. When the sliding member is released from an initial angle and rotates relative to the second member, the latch member is pushed by a resilient element and is joined in a recess of the sliding member, thus preventing sliding between the first member and the sliding member.

18 Claims, 13 Drawing Sheets

ELECTRONIC DEVICE AND MOVING MECHANISM THEREOF

CROSS REFERENCE TO RELATED APPLICATIONS

This application claims priority of Taiwan Patent Application No. 098120381, filed on Jun. 18, 2009, the entirety of which is incorporated by reference herein.

BACKGROUND OF THE INVENTION

1. Field of the Invention

This application relates in general to an electronic device and in particular to an electronic device having a moving mechanism.

2. Description of the Related Art

Referring to FIGS. 1A~3B, a conventional sliding-type mobile phone includes a first module 100 and a second module 200 reciprocally movable with respect to each other, wherein the first module 100 includes a screen 110, and the second module 200 includes a keypad 210.

Figure 2A:
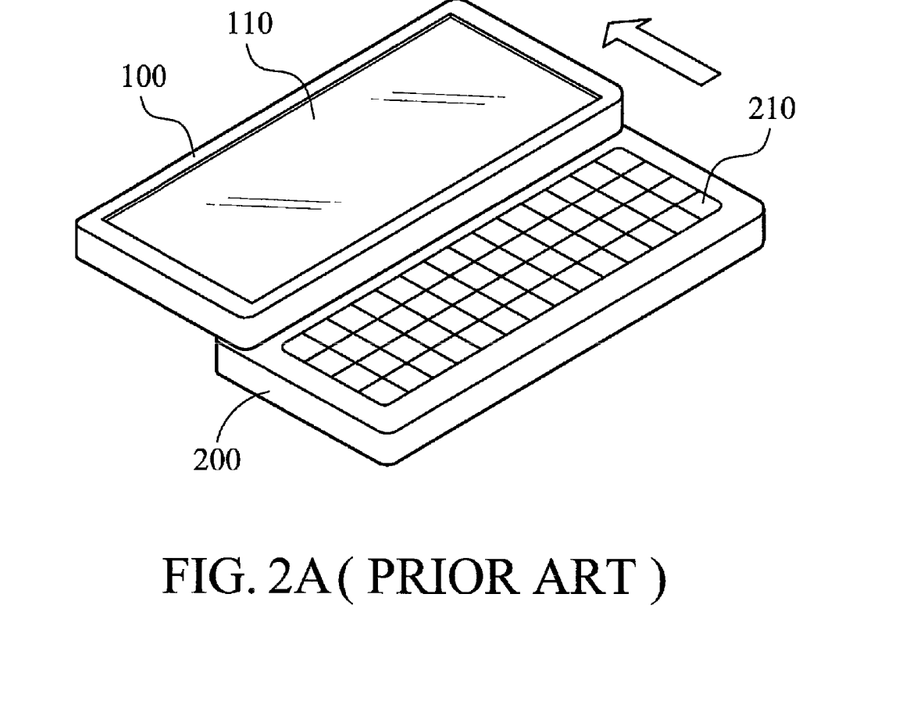
FIG. 2A is a perspective diagram of a first module sliding with respect to an second module of a conventional mobile phone.
Figure 2B:
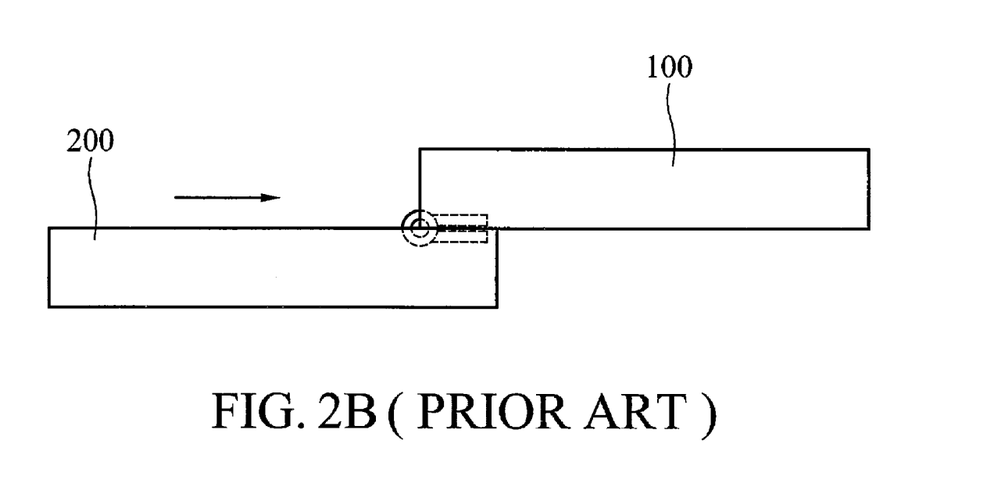
FIG. 2B is a side view of the mobile phone in FIG. 2A.
Figure 3A:
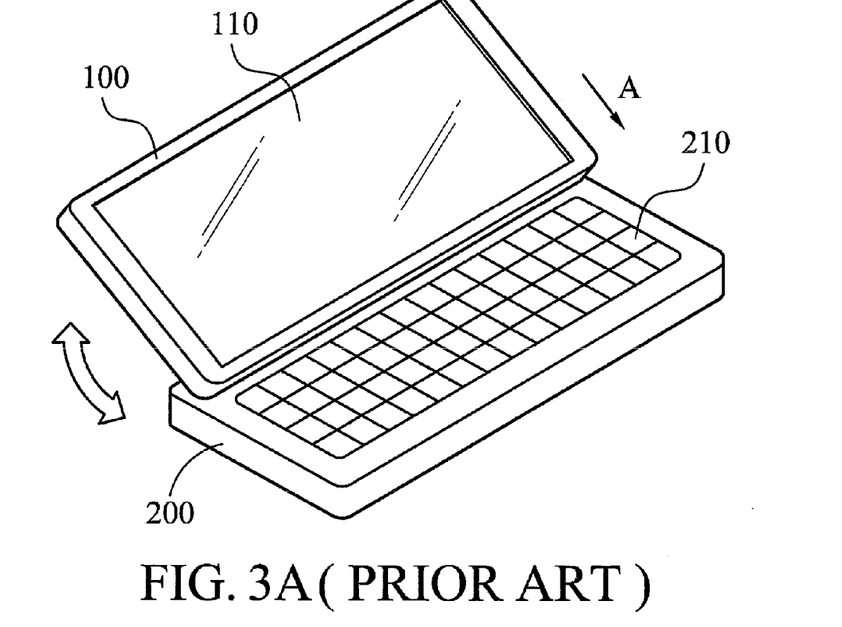
FIG. 3A is a perspective diagram of a first module rotating upwardly with respect to an second module of a conventional mobile phone.

The first module 100 and the second module 200 are usually connected via a sliding mechanism and a pivot. When the first module 100 slides to an open position with respect to the second module 200, as shown in FIGS. 2A and 2B, the first module 100 can rotate upwardly to form a tilt angle for convenient usage, as shown in FIGS. 3A and 3B.

Figure 3B:
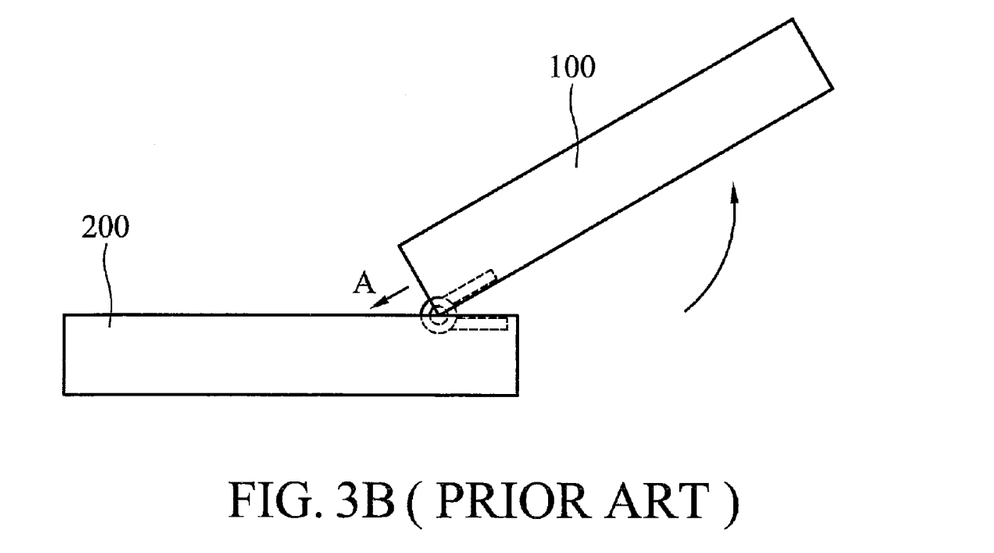
FIG. 3B is a side view of the mobile phone in FIG. 3A.

In FIG. 3B, when the first module 100 rotates upwardly with respect to the second module 200, the first module 100 may slide along the A direction and impact the second module 200, thus leading to mechanical failure and reducing life of usage.

BRIEF SUMMARY OF INVENTION

The application provides a moving mechanism of an electronic device including a first member, a second member, a sliding member slidably connected to the first member, and a pivot rotatably connecting the second member with the sliding member. When the first member slides relative to the sliding member, a latch member on the first member is pressed by the sliding member to a retracted position. When the sliding member is released from an initial angle and rotates relative to the second member, the latch member is pushed by a resilient element and is joined in a recess of the sliding member, thus preventing sliding between the first member and the sliding member.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1A:
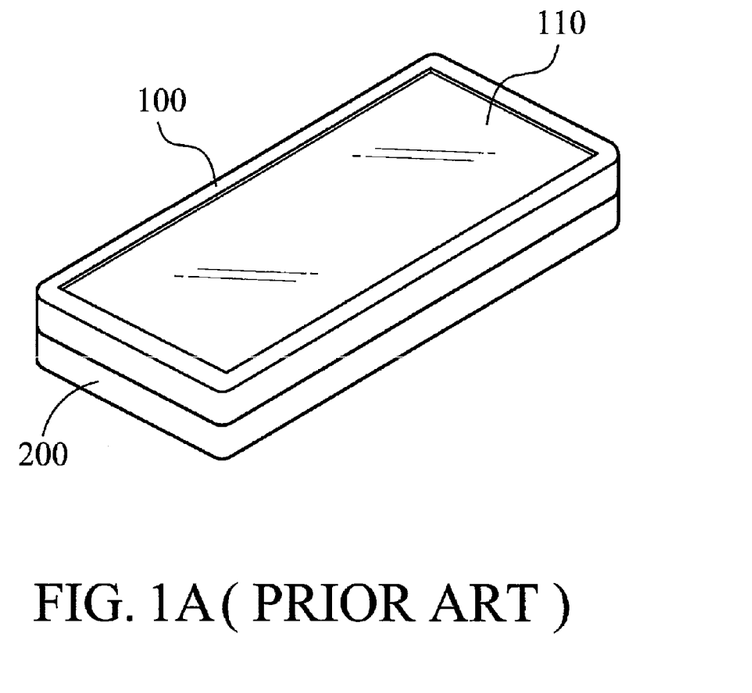
FIG. 1A is a perspective diagram of a conventional sliding-type mobile phone when in a closed state.
Figure 1B:
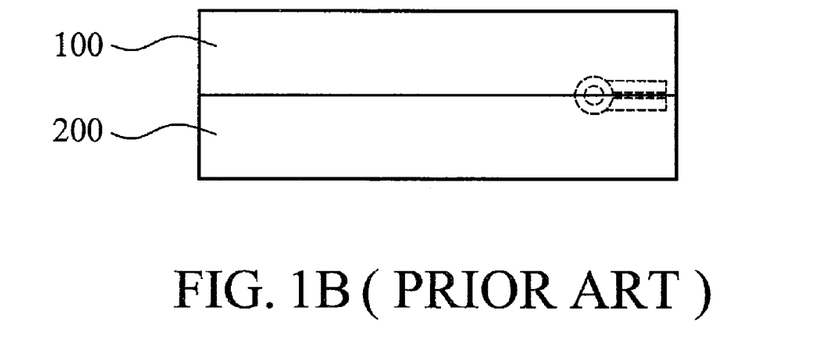
FIG. 1B is a side view of the mobile phone in FIG. 1A.
Figure 4A:
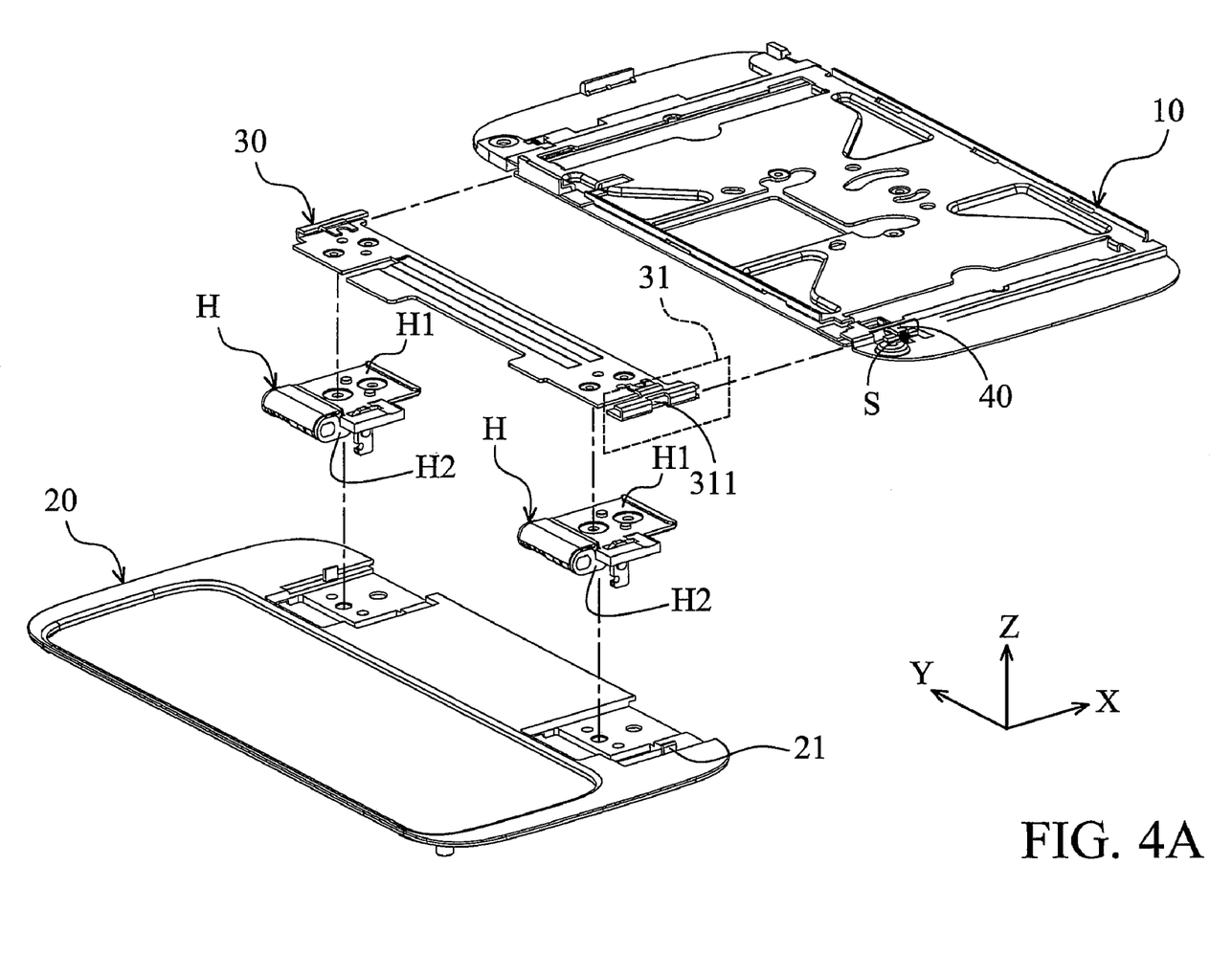
FIG. 4A is an exploded diagram of a moving mechanism according to an embodiment of the invention.

Referring to FIG. 4A, an embodiment of a moving mechanism is disposed in an electronic device to movably connect a first module and a second module, such as the first module 100 and the second module 200 shown in FIG. 1A. The electronic device of the application may be a mobile phone, PDA, pocket PC, Ultra-Mobile PC (UMPC), or tablet PC.

The moving mechanism in this embodiment includes a first member 10, a second member 20, a sliding member 30, and at least a pivot H, wherein the first and second members 10 and 20 are respectively fixed to the aforesaid first module 100 and second module 200. As shown in FIG. 4A, the first member 10 is movably disposed on the sliding member 30 along the X direction. The pivot H includes a first arm H1 and a second arm 112 rotatable with respect to each other. The sliding member 30 is mounted on the first arm H1, and the second arm H2 is mounted on the second member 20. Hence, the first member 10 and the sliding member 30 are rotatable with respect to the second member 20 via the pivot H.

Figure 4B:
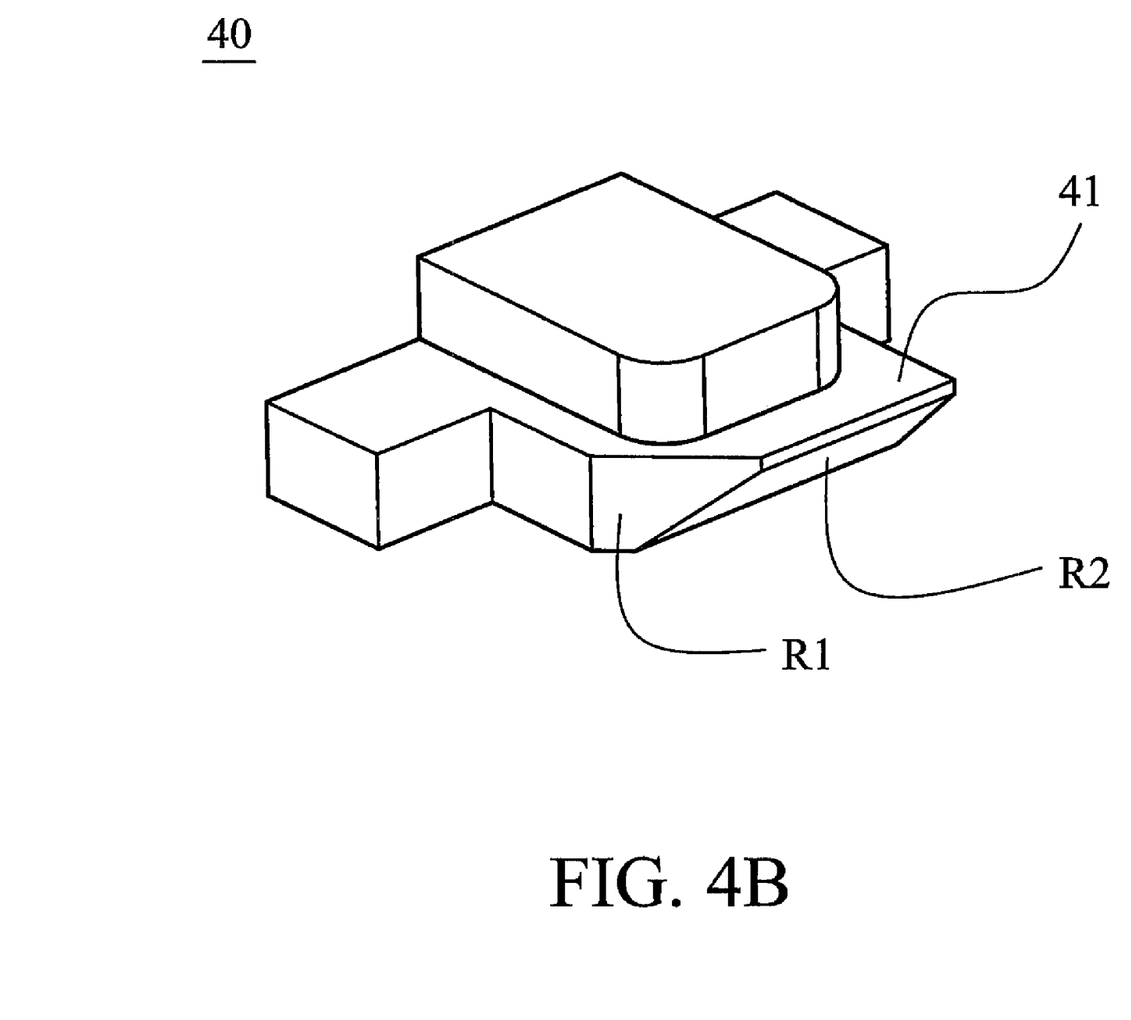
FIG. 4B is a perspective diagram of a latch member according to an embodiment of the invention.

The moving mechanism shown in FIG. 4A further includes a latch member 40 and a resilient member S disposed on the first member 10. The resilient member S may be a helical spring arranged between the latch member 40 and the first member 10, so as to exert a spring force on the latch member 40. In this embodiment, the sliding member 30 has a joining portion 31 which forms a recess 311 on a side edge of the sliding member 30, and the second member 20 has a nub 21 corresponding to the recess 311. Referring to FIG. 4B, the latch member 40 has a protrusion 41 forming a first slope R1 and a second slope R2 on the lateral and bottom sides thereof.

Figure 5A:
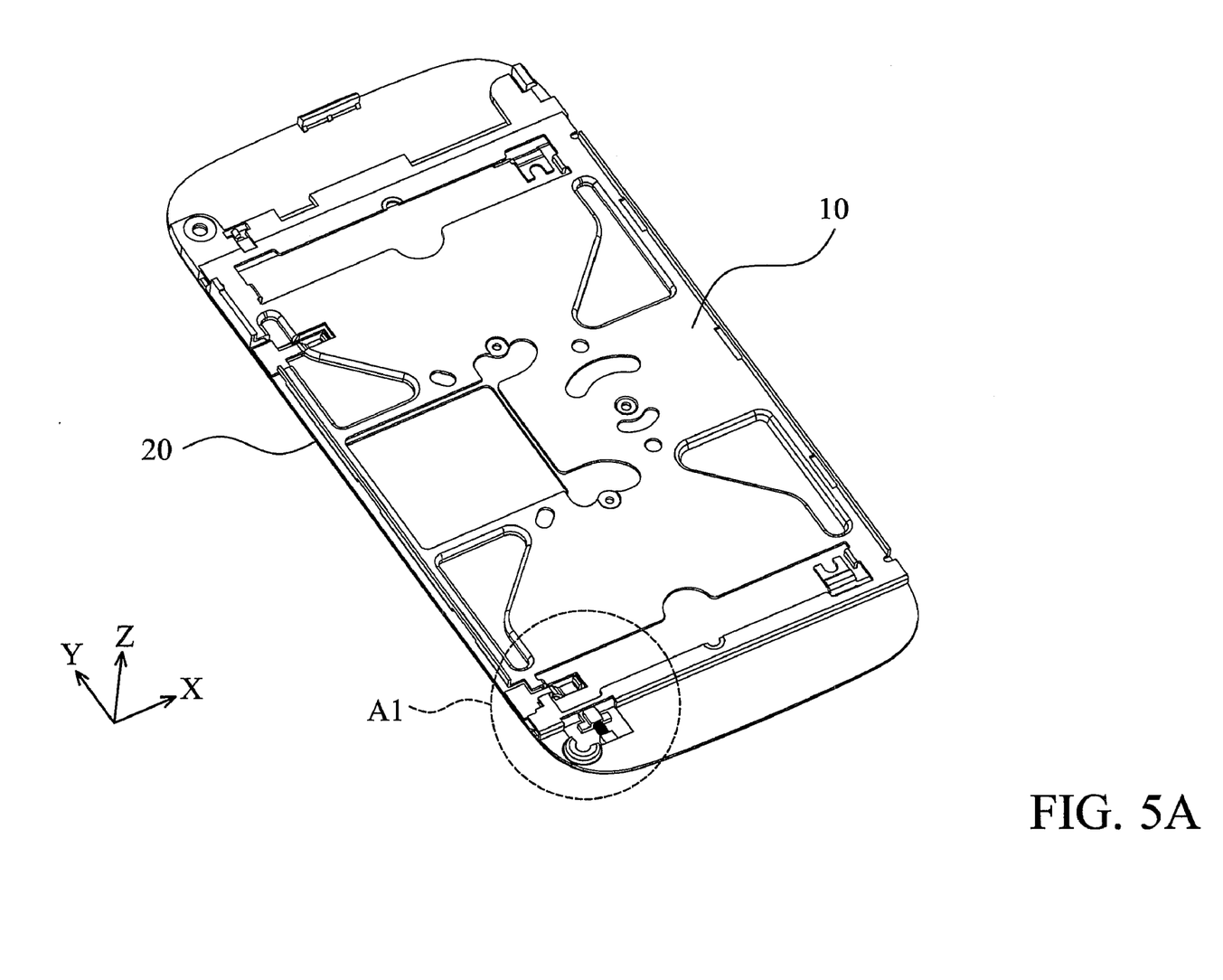
FIG. 5A is a perspective diagram of a moving mechanism when in a closed state.
Figure 5B:
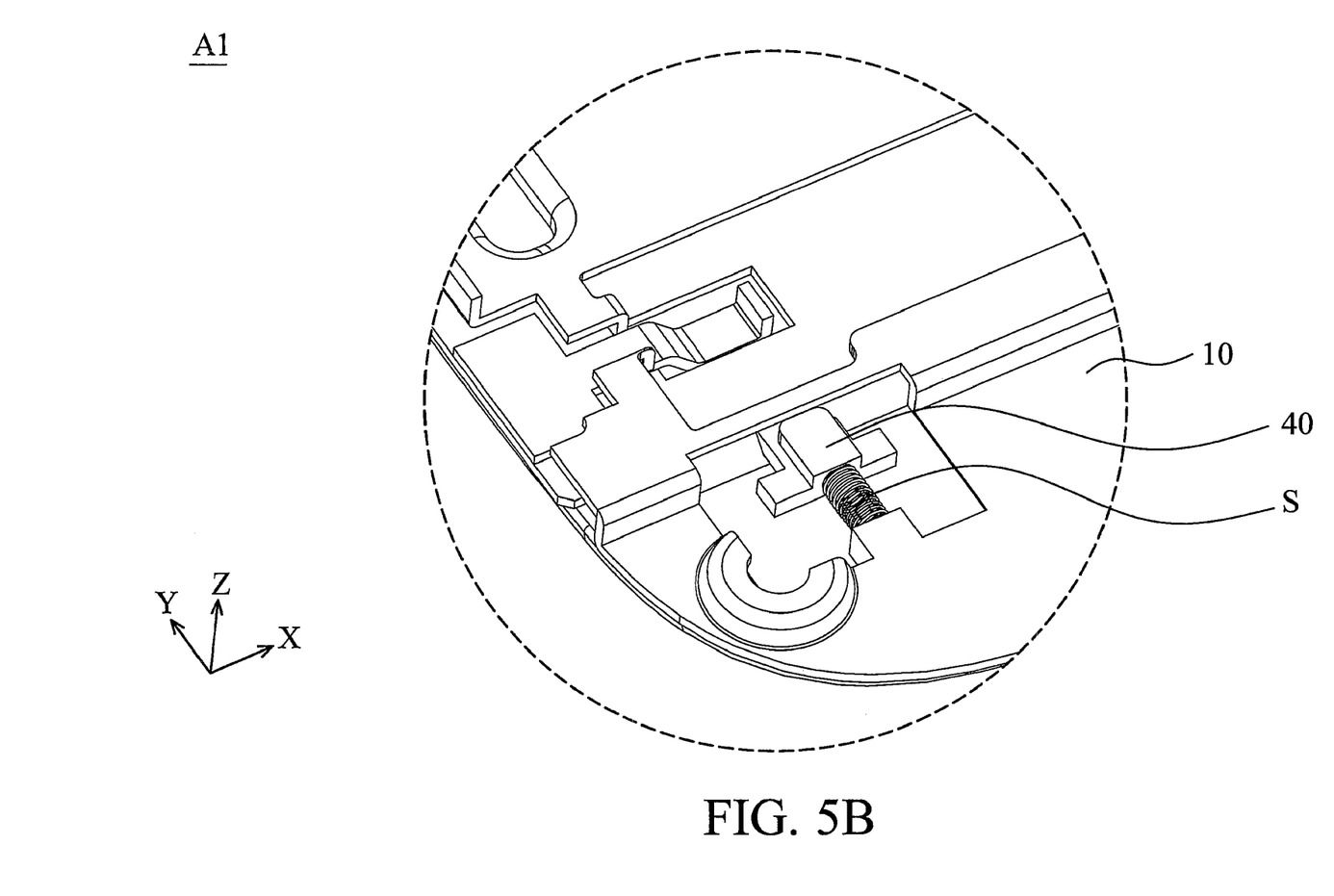
FIG. 5B is a large view of the portion A1 shown in FIG. 5A.
Figure 6A:
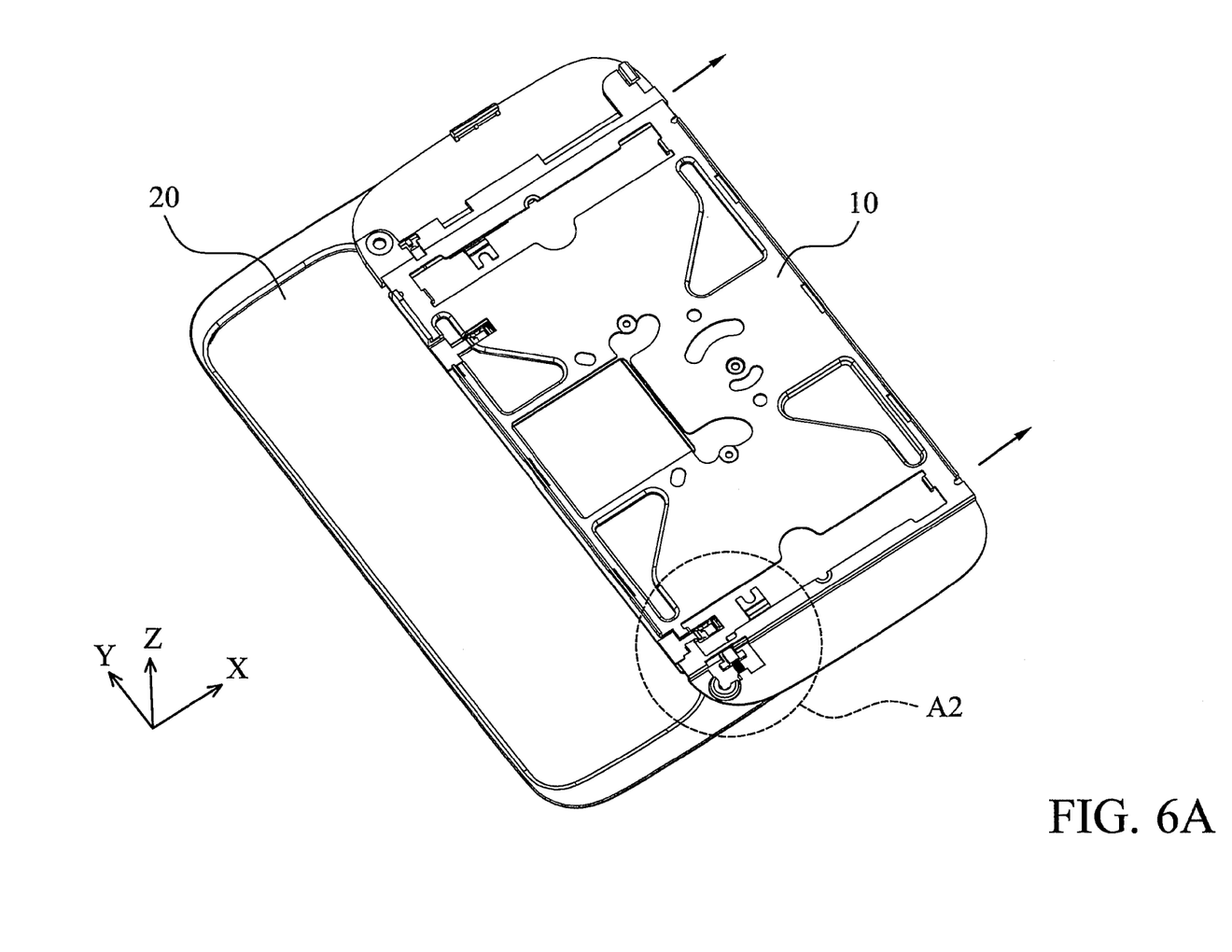
FIG. 6A is a perspective diagram of a first member sliding with respect to a second member of a moving mechanism according to an embodiment of the invention.
Figure 6B:
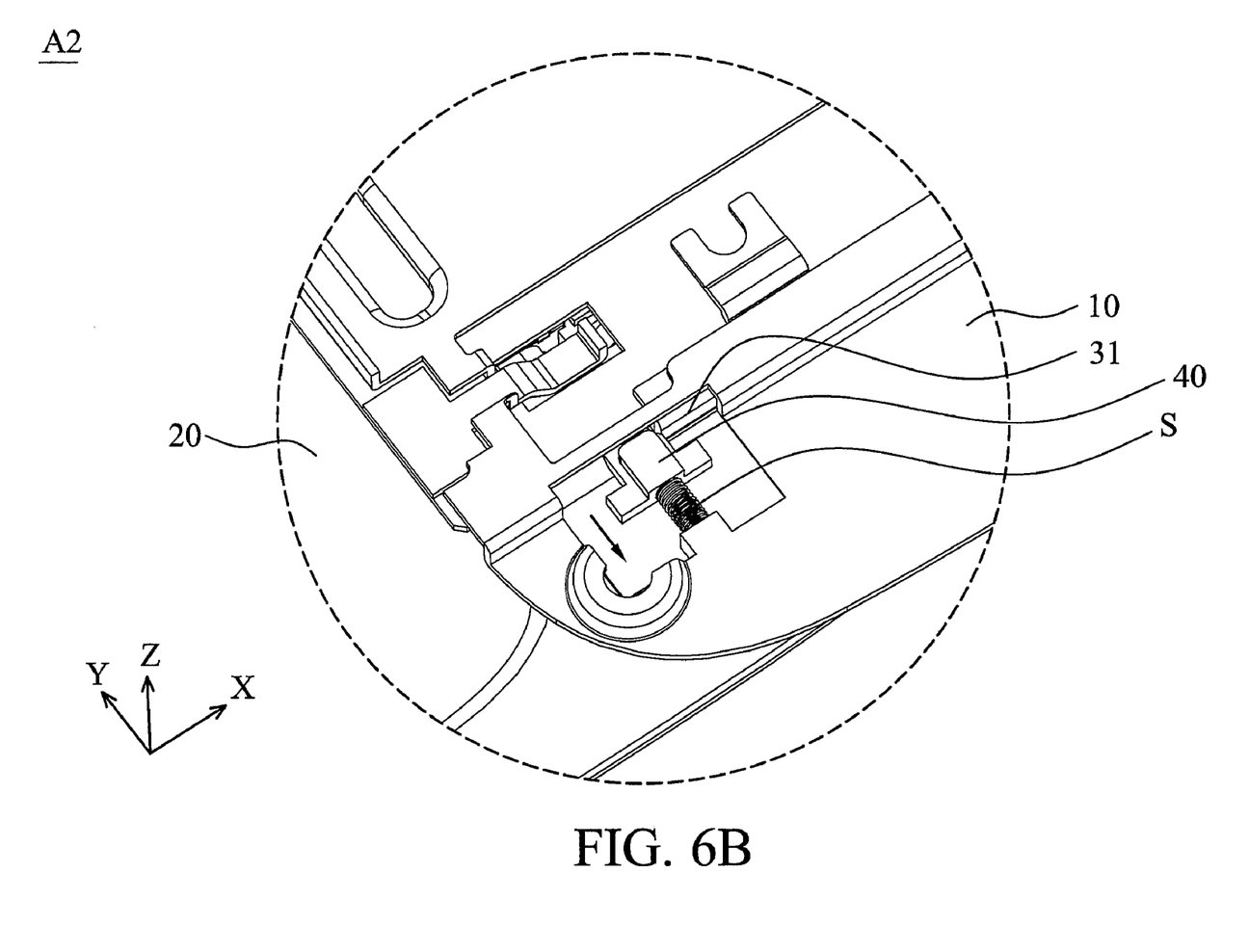
FIG. 6B is a large view of the portion A2 shown in FIG. 6A.

The detailed operation of the moving mechanism is shown in FIGS. 5A-8B. When the first and second members 10 and 20 overlap and are situated in a closed state, as shown in FIGS. 5A and 5B, the latch member 40 is in a predetermined position on the first member 10. Referring to FIGS. 6A and 6B, when the first member 10 slides along the X direction (first direction) relative to the sliding member 30 and the second member 20, the joining portion 31 of the sliding member 30 contacts the first slope R1 of the latch member 40, and the latch member 40 is pushed backward to a retracted position along the −Y direction (second direction), as the arrow indicates in FIG. 6B.

Figure 7A:
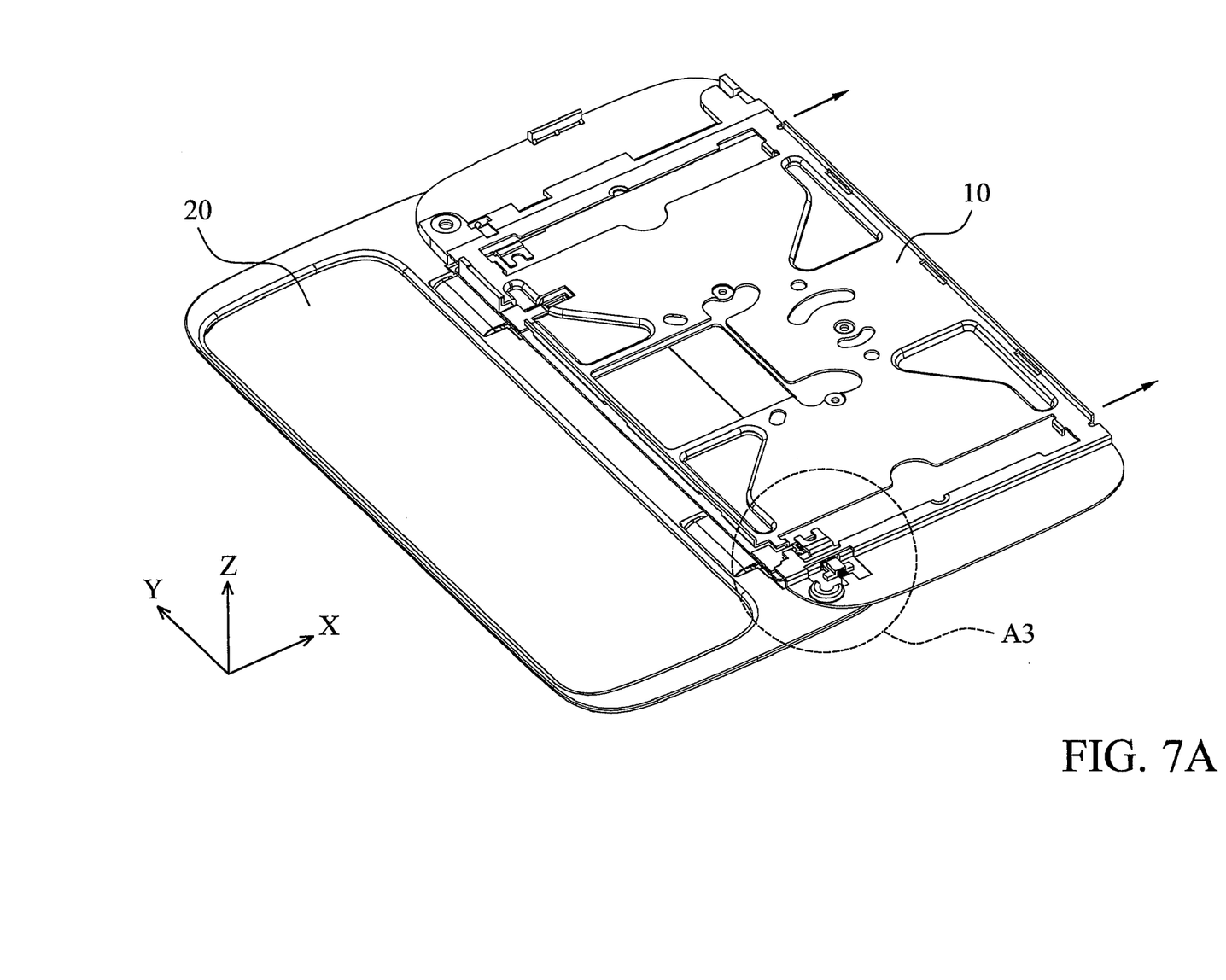
FIG. 7A is a perspective diagram of a first member of a moving mechanism sliding to an open position according to an embodiment of the invention.
Figure 7B:
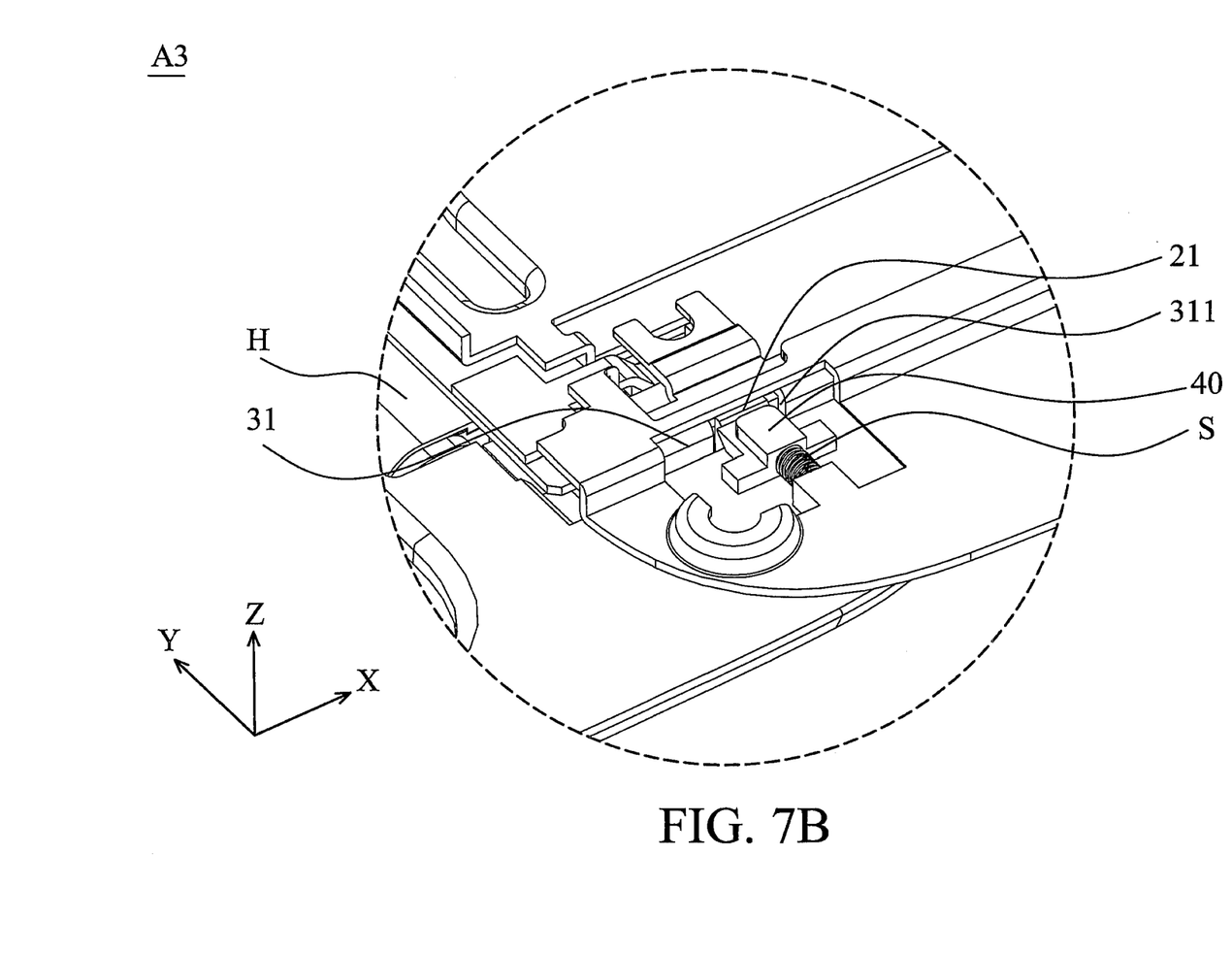
FIG. 7B is a large view of the portion A3 shown in FIG. 7A.

Referring the FIGS. 7A and 7B, with continuous movement of the first member 10 along the X direction to an open position, the latch member 40 slides along the side edge of the joining portion 31, until the latch member 40 is aligned with the recess 311. In this embodiment, when the first member 10 slides relative to the sliding member 30 and the second member 20 along the X direction, the first member 10 and the sliding member 30 can remain folded at an initial angle with respect to the second member 20. As shown in FIG. 7B, when the latch member 40 is sliding to the open position and is aligning with the recess 311, the latch member 40 is kept out of the recess 311 by the nub 21 of the second member 20 accommodated therein. Namely, the latch member 40 is not joined in the recess 311 in this state.

Figure 8A:
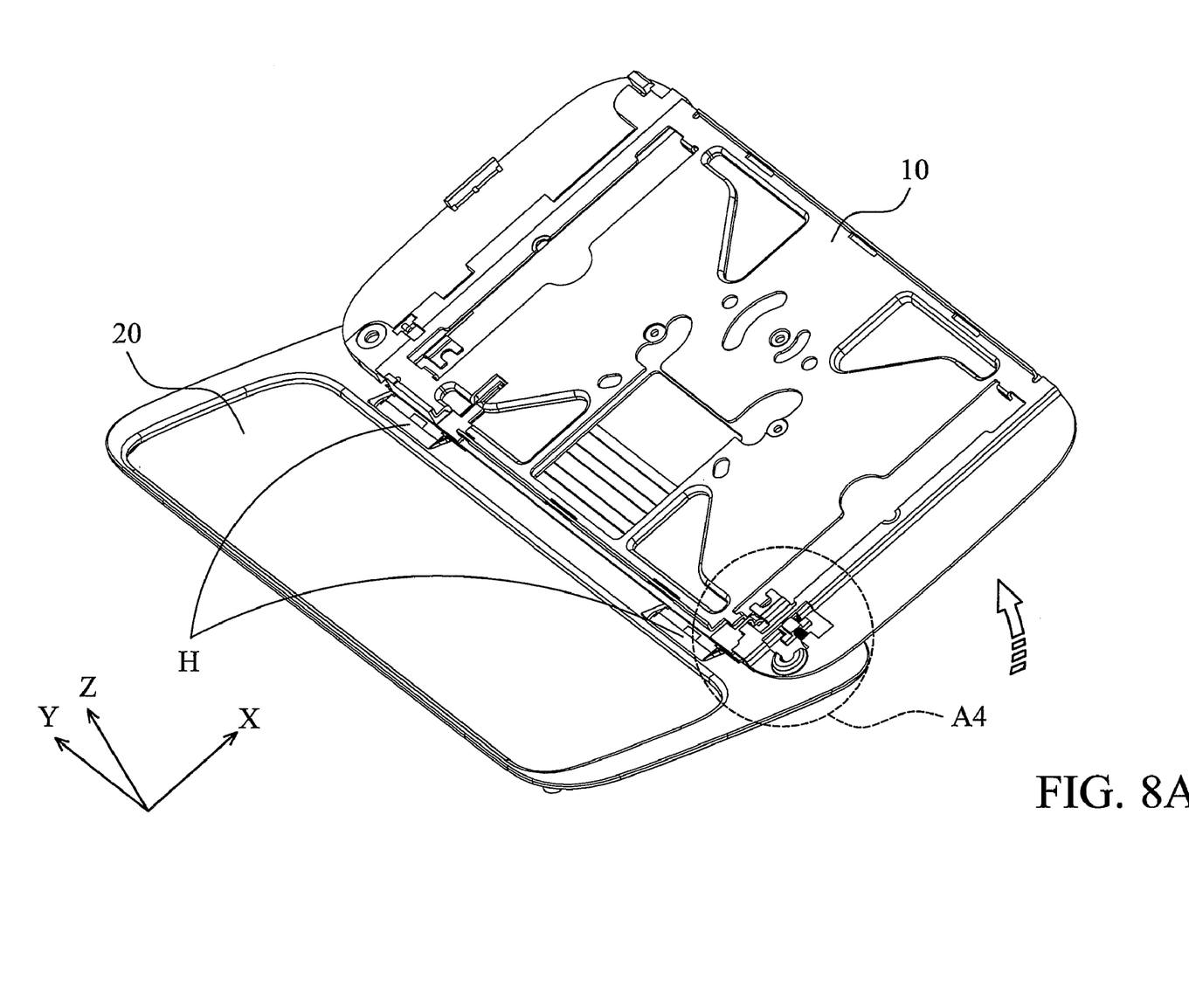
FIG. 8A is a perspective diagram of a first member rotating upwardly with respect to a second member of a moving mechanism according to an embodiment of the invention.
Figure 8B:
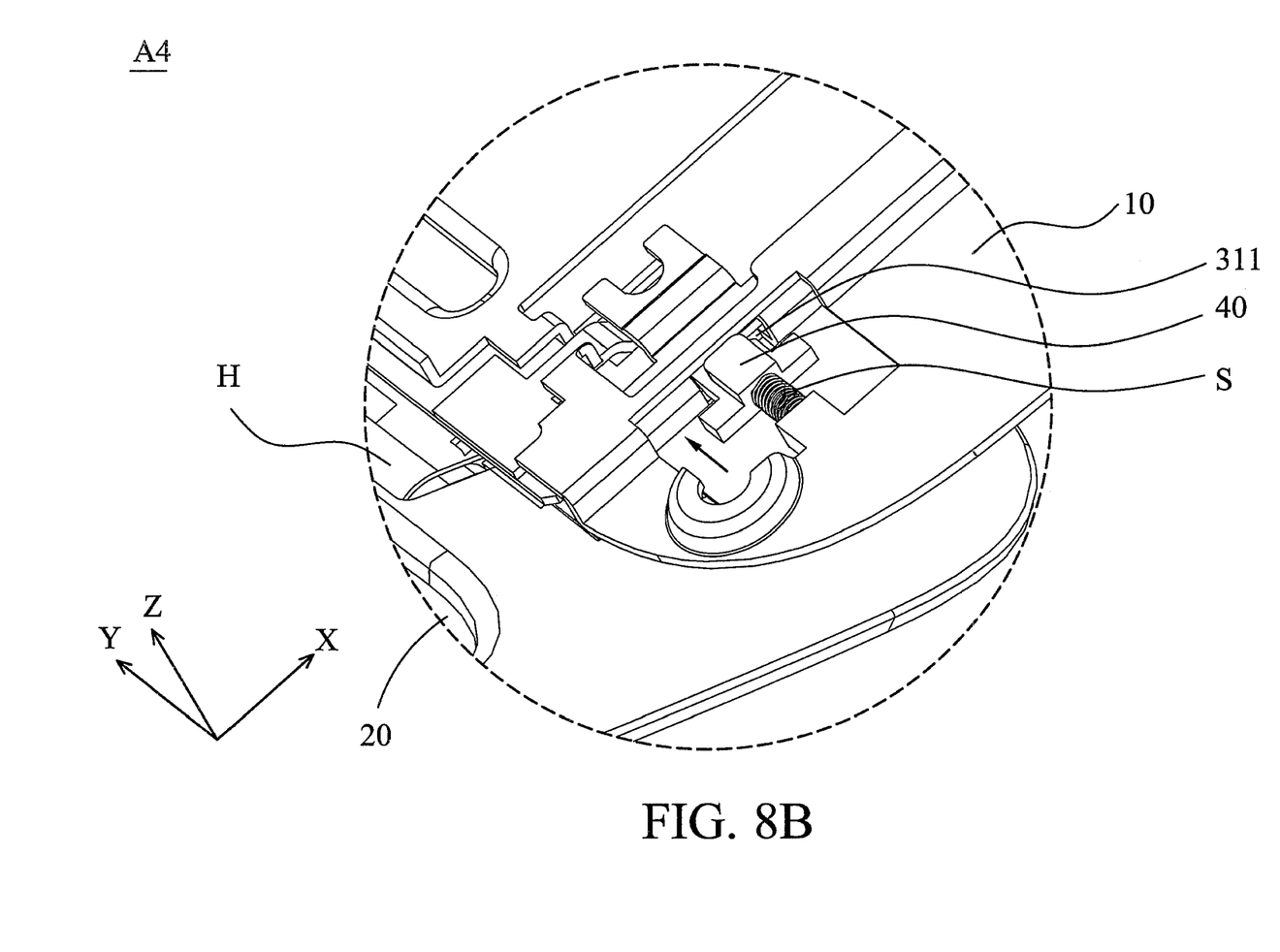
FIG. 8B is a large view of the portion A4 shown in FIG. 8A.

Referring to FIGS. 8A and 8B, when the first member 10 slides to the open position, the first member 10 and the sliding member 30 can be rotated and unfolded with respect to the second member 20. In this embodiment, when the first member 10 and the sliding member 30 are rotated and released from the initial angle, the nub 21 of the second member 20 is separated from the recess 311. Meanwhile, the latch member 40 is forced by spring force of the resilient member S and joined into the recess 311, as the arrow indicates in FIG. 8B, thus preventing sliding of the first member 10 relative to the sliding member 30. Thus, efficiently avoiding damage due to sliding impact between the first and second members 10 and 20.

When returning the moving mechanism to the closed state of FIG. 5, the first member 10 in FIG. 8A is pressed and reversely rotated toward the second member 20, as shown in FIG. 7A, wherein the nub 21 of the second member 20 intrudes into the recess 311 from the bottom thereof. With insertion of the nub 21 into the recess 311, the second slope R2 at the bottom of the latch member 40 is pressed by the nub 21, such that the latch member 40 is pushed and separated from the recess 11 to the retracted position, as shown in FIG. 7B. Subsequently, the first member 10 slides relative to the sliding member 30 and the second member 20 along the –X direction, and the moving mechanism returns to the closed state shown in FIG. 5A.

The application provides an electronic device and a moving mechanism thereof. The moving mechanism includes a first member, a second member, and a sliding member. The first member can rotate with respect to the second member when moving to an open position. Sliding between the first member and the sliding member is prevented, as a latch member is joined in a recess of the sliding member. Thus, mechanical failure and collision between components within the electronic device are eliminated to extend life of usage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
    a first module;
    a second module; and
    a moving mechanism, comprising:
        a first member, fixed to the first module;
        a second member, fixed to the second module, wherein the second member comprises a nub;
        a pivot;
        a sliding member, slidably connecting to the first member and pivotally connecting to the second member via the pivot, wherein the sliding member comprises a joining portion which forms a recess, wherein the nub is received in the recess when the sliding member is tilted in an initial angle with respect to the second member, and the nub separates from the recess when the sliding member rotates with respect to the second member and is released from the initial angle;
        a latch member, movably disposed on the first member, wherein when the first member slides relative to the sliding member along a first direction, the joining portion contacts and forces the latch member along a second direction; and
        a resilient member, connecting the latch member with the first member, wherein the latch member is forced by the resilient member to engage in the recess when the sliding member rotates with respect to the second member and is released from the initial angle, so as to prevent sliding between the first member and the sliding member.

2. The electronic device as claimed in claim 1, wherein the latch member has a first slope, and when the first member slides relative to the sliding member along the first direction, the joining portion presses the first slope to force the latch member along the second direction.

3. The electronic device as claimed in claim 2, wherein the latch member further has a second slope, and when the sliding member rotates to the initial angle with respect to the second member, the nub presses the second slope and forces the latch member along the second direction to be released from the recess.

4. The electronic device as claimed in claim 3, wherein the first slope is adjacent to the second slope.

5. The electronic device as claimed in claim 3, wherein the latch member further has a protrusion with the first and second slopes formed thereon.

6. The electronic device as claimed in claim 1, wherein the latch member has a slope, and when the sliding member rotates to the initial angle with respect to the second member, the nub presses the slope and forces the latch member along the second direction to be released from the recess.

7. The electronic device as claimed in claim 1, wherein the second direction is substantially perpendicular to the first direction.

8. The electronic device as claimed in claim 1, wherein the resilient member is a helical spring.

9. The electronic device as claimed in claim 1, wherein the joining portion is disposed on a side edge of the sliding member.

10. A moving mechanism for connecting a first module with a second module of an electronic device, comprising:
    a first member, adapted to be fixed to the first module;
    a second member, adapted to be fixed to the second module, wherein the second member comprises a nub;
    a pivot;
    a sliding member, slidably connecting to the first member and pivotally connecting to the second member via the pivot, wherein the sliding member comprises a joining portion which forms a recess, wherein the nub is received in the recess when the sliding member is tilted in an initial angle with respect to the second member, and the nub separates from the recess when the sliding member rotates with respect to the second member and is released from the initial angle;
    a latch member, movably disposed on the first member, wherein when the first member slides relative to the sliding member along a first direction, the joining portion contacts and forces the latch member along a second direction; and
    a resilient member, connecting the latch member with the first member, wherein the latch member is forced by the resilient member to engage in the recess when the sliding member rotates with respect to the second member and is released from the initial angle, so as to prevent sliding between the first member and the sliding member.

11. The moving mechanism as claimed in claim 10, wherein the latch member has a first slope, and when the first member slides relative to the sliding member along the first direction, the joining portion presses the first slope to force the latch member along the second direction.

12. The moving mechanism as claimed in claim 11, wherein the latch member further has a second slope, and when the sliding member rotates to the initial angle with respect to the second member, the nub presses the second slope and forces the latch member along the second direction to be released from the recess.

13. The moving mechanism as claimed in claim 12, wherein the first slope is adjacent to the second slope.

14. The moving mechanism as claimed in claim 12, wherein the latch member further has a protrusion with the first and second slopes formed thereon.

15. The moving mechanism as claimed in claim 10, wherein the latch member has a slope, and when the sliding member rotates to the initial angle with respect to the second member, the nub presses the slope and forces the latch member along the second direction to be released from the recess.

16. The moving mechanism as claimed in claim 10, wherein the second direction is substantially perpendicular to the first direction.

17. The moving mechanism as claimed in claim 10, wherein the resilient member is a helical spring.

18. The moving mechanism as claimed in claim 10, wherein the joining portion is disposed on a side edge of the sliding member.

* * * * *